(12) United States Patent
Laveran

(10) Patent No.: US 6,494,254 B2
(45) Date of Patent: Dec. 17, 2002

(54) BRAZED TUBE FOR A HEAT EXCHANGER, METHOD OF MANUFACTURE AND EXCHANGER

(75) Inventor: Jean-Louis Laveran, Asnieres S/Seine (FR)

(73) Assignee: Valeo Thermique Moteur, La Verriere (FR)

(*) Notice: Subject to any disclaimer, the term of this patent is extended or adjusted under 35 U.S.C. 154(b) by 0 days.

(21) Appl. No.: 09/884,014

(22) Filed: Jun. 20, 2001

(65) Prior Publication Data
US 2002/0007940 A1 Jan. 24, 2002

(30) Foreign Application Priority Data
Jun. 22, 2000 (FR) .............................. 00 08021

(51) Int. Cl.⁷ .............................. F28F 1/02; B21D 53/05
(52) U.S. Cl. ........................ 165/133; 165/177; 228/183; 29/890.053
(58) Field of Search ................... 165/133, 177; 29/890.053; 228/183

(56) References Cited

U.S. PATENT DOCUMENTS

| 4,660,754 A | | 4/1987 | Byrd | |
|---|---|---|---|---|
| 4,945,635 A | * | 8/1990 | Nobusue et al. | 165/173 |
| 5,445,219 A | * | 8/1995 | Hutto et al. | 165/153 |
| 5,579,837 A | * | 12/1996 | Yu et al. | 165/177 |
| 5,765,634 A | * | 6/1998 | Martins | 165/177 |
| 5,768,782 A | | 6/1998 | Kato | |

FOREIGN PATENT DOCUMENTS

| DE | 19958935 | 6/2000 |
|---|---|---|
| EP | 0351044 | 1/1990 |
| EP | 0811820 | 12/1997 |
| FR | 2765817 | 1/1999 |
| FR | 2786558 | 6/2000 |
| GB | 671720 | 5/1952 |

* cited by examiner

Primary Examiner—Allen Flanigan
(74) Attorney, Agent, or Firm—Liniak, Berenato & White

(57) ABSTRACT

A tube for a heat exchanger consists of a folded metal strip having an outer face covered with a plating of brazing alloy (31) and including at least one folded border (28) having a sheared edge bearing on an inner face (34) of the metal strip. The metal strip is folded by passing through a series of successive rollers. The sheared edge is covered with a layer of brazing alloy (31) which has advantageously been pushed back by the rollers from the outer surface towards the sheared edge. According to the method, the metal strip is made to pass between a series of rollers, each roller including a surface which exhibits an inclination with respect to the rotational axle of the rollers, the inclinations of the successive rollers continually increasing.

5 Claims, 2 Drawing Sheets

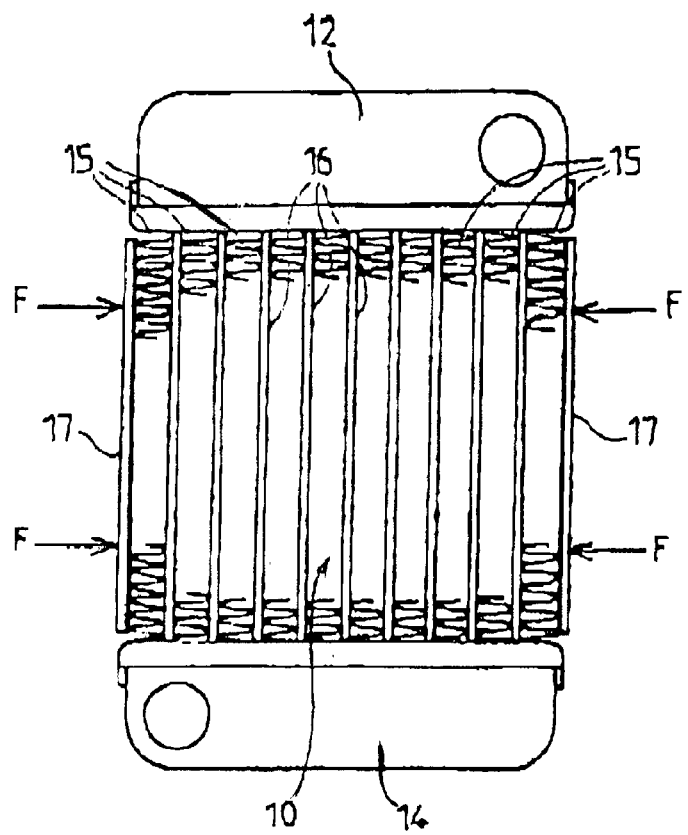
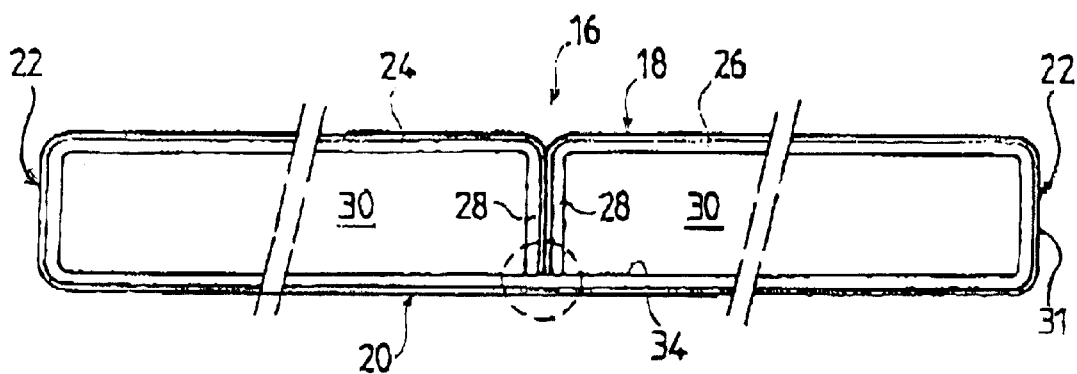
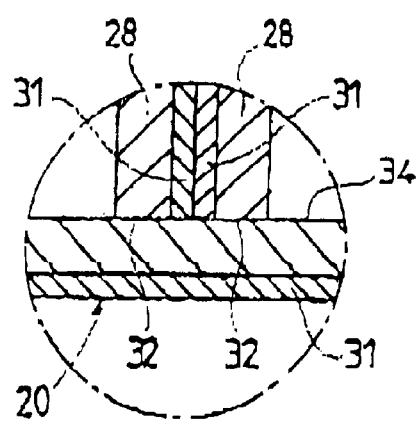

BRAZED TUBE FOR A HEAT EXCHANGER, METHOD OF MANUFACTURE AND EXCHANGER

BACKGROUND OF THE INVENTION

The present invention relates to a folded and brazed tube for a heat exchanger such as a radiator for cooling a motor-vehicle engine, for example.

More precisely, the invention relates to such a tube consisting of a metal strip having an outer face and an inner face, the outer face being covered with a plating of brazing alloy, the metal strip being folded by passage through a series of successive rollers and including at least one folded border having a sheared edge bearing on an inner face of the metal strip.

In a tube of this type, the sheared edge of the metal strip originates from the cutting-cut of a foil of greater length, and it does not include any plating of brazing alloy. Moreover, the inner face of the metal strip, which is generally covered with an anti-corrosion layer, is not covered with brazing alloy either joining by brazing of the inner face with the border is very problematic.

It might be thought to resolve this problem by depositing some brazing alloy on the sheared edge of the metal strips. However, such an operation would be intricate to carry out and would be expensive.

The precise object of the present invention is a tube for a heal exchanger in embodiments of which a joint by good-quality brazing between the border and the inner races of the tube can easily be obtained.

BRIEF SUMMARY OF THE INVENTION

This object may be achieved, in accordance with the invention, by the fact that the sheared edge of the metal strip is covered with a layer of brazing alloy.

The present of this quantity of brazing alloy allows a quality joint between the two pieces, namely a joint which is both leaktight and mechanically tough.

In one preferred embodiment of the invention, the layer of brazing alloy is pushed back mechanically from the outer face towards the sheared edge.

Particularly advantageously, the layer of brazing alloy is pushed back by the abovementioned rollers.

The invention also relates to a method of manufacturing a tube by folding of a metal strip including a plating of brazing alloy on an outer face. According to this method, the metal strip is made to pass between a series of rollers which are shaped to push back the layer of brazing alloy from the outer face towards the sheared edge.

Advantageously, each roller includes a surface which exhibits an angle of inclination with respect to its rotational axis, the angles of inclination of the successive rollers continually increasing.

Finally, a heat exchanger according to the invention, especially for a motor vehicle, consists of a bank of tubes alternating with corrugated spacers, the sheared edge of the borders of the tubes being covered with a layer of brazing alloy. This layer has preferably been pushed back by rollers from the outer face towards the sheared edge.

Other characteristics and advantages of the present invention will emerge further upon reading the description which follows of embodiment examples given as an illustration by reference to the attached figures.

BRIEF DESCRIPTION OF THE DRAWINGS

In these figures:

FIG. 1 is an overall view of a radiator for which a tube in accordance with the present invention is intended;

FIG. 2 is a view, in cross section, of a tube of the prior art;

FIG. 3 is a view on an enlarged scale of a part of the tube of FIG. 2;

DETAILED DESCRIPTION OF THE INVENTION

Figure 4:
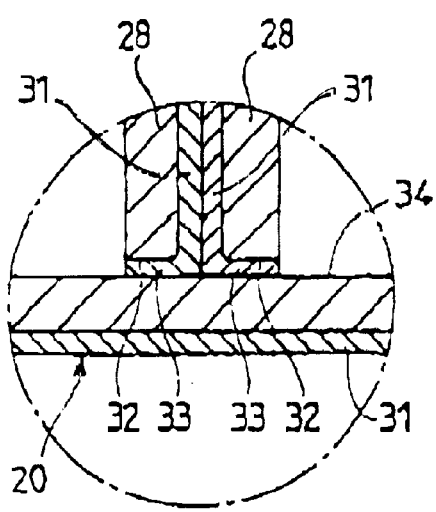
FIG. 4 is a view on an enlarged scale showing the contact between the border and the inner face of a tube according to a first embodiment of the invention.

The heat exchanger represented in FIG. 1 comprises a tube bank 10 mounted between two manifold chambers 12 and 14. The bank 10 consists of a multiplicity of tubes 16 arranged parallel to each other and alternating with spacers 15. Those spacers are of the corrugated type. They are formed from metal foil which is folded so as to constitute corrugations. Hence, a spacer 15 arranged between two adjacent tubes 16 comes info contact with two tubes via end regions of the corrugations.

The heat exchanger further includes two cheeks 17, also called crosspieces, which frame the tube bank and are arranged parallel to the tubes 16.

The pieces which constitute the exchanger are bold assembled on a table (not represented) and pressure is exerted on the cheeks 17 in the direction of the arrows F so as to hold the tubes 16, spacers 15 and cheeks 17 respectively with a view to the brazing operation.

Figure 7:
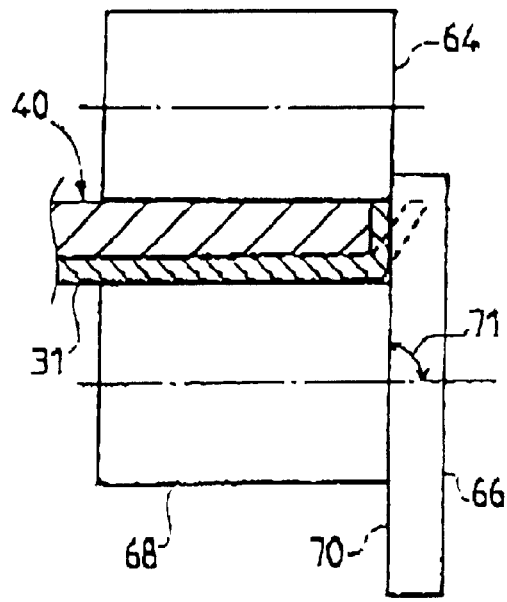
FIG. 7 is a view similar to FIG. 5 showing a third pair of rollers for implementing a final stage of the method of the invention.

The tube 16 represented in FIG. 7 is produced from a metal strip, for example of aluminum, folded in several successive operations by virtue of rollers according to a known technique. It exhibits a very much flattened, rectangular cross-section comprising large faces 18 and 70 and two small faces 22. The large face 18 consists of two parts 24 and 26 which are joined together in the middle or the large face 18. The metal strip is folded at right angles to the extremities of the parts 24 and 26 so as to form side-by-side borders 28 which bear on an inner face 34 of the large face 20. These borders have the function, on the one hand, of delimiting separate circulation channels 30 for a fluid, and, on the other hand, of constituting a distance piece between the two large faces so as to guarantee that they are parallel and flat. In order to allow brazing of the tube, the natal strip is covered externally with a brazing plating 31, the inner face 34 being covered with an anti-corrosion plating (not represented). As can be seen in greater detail in FIG. 3, the borders 28 are in contact via their plating of brazing alloy. They can therefore be brazed easily to one another. In contrast, neither the sheared edge 32 of the borders, nor the inner face 34 of the tube includes a plating of brazing alloy. A joint by brazing can therefore not be obtained easily.

In FIG. 4 has been represented a detailed view similar to FIG. 3 which shows the junction between the border 28 and the inner face 34 of a tube for a heat exchanger. As can be seen, the sheared edge 32 of the borders is covered with a certain amount 33 of brazing alloy which has been brought from the outer face of the metal strip towards the sheared edge by means of rollers, as will be explained in greater detail later. By virtue of the presence of this brazing alloy 33 interposed between the outer face 34 and the sheared edge 32 of the borders, a joint with good mechanical properties can easily be obtained by bracing.

Figure 5:
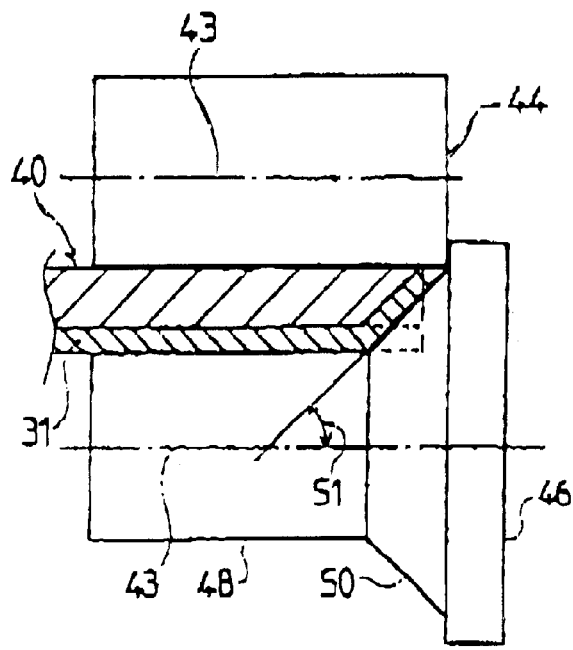
FIG. 5 is a detailed view of a pair of rollers for implementing the method of the invention.
Figure 6:
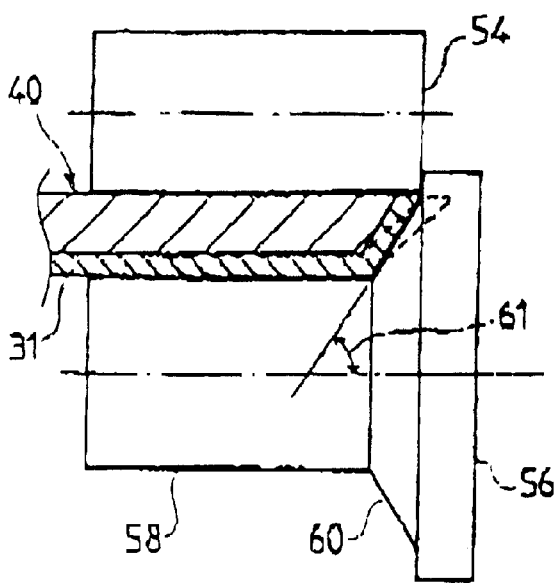
FIG. 6 is a view similar to FIG. 5 showing a second pair of rollers for implementing a subsequent stage of the method of the invention.

Detailed views have been represented in FIGS. 5, 6 and 7 which show successive stages of the method of the invention. In FIG. 5, the reference 40 designates the right-hand extremity (according to the figure) of a metal strip from which the lobe is produced by folding. At this stage of the method, the strip is still flat. It is covered on its lower face, which becomes its outer face, with a plating of brazing alloy 31. The extremity of the metal strip 40 passes between two rollers turning about axes 43, namely an upper roller 44 and a lower roller 46. The upper roller 44 is cylindrical. The lower roller 46 features a cylindrical part 48 which is extended by a frustoconical part 50 with a half-angle at the center 51. The angle 51 is also equal to the angle of the frustoconical part with respect to the surface of the metal strip, since the latter is parallel to the axis of the rollers. The position of the metal strip 40 is set in such a way that its sheared edge is compressed between the frustoconical part 50 and the cylindrical roller 44. In this way, the extremity of the metal strip is thinned and tapered by passing between the rollers.

FIG. 6 illustrates a subsequent stage of the method. The lower roller 56, like the lower roller 46, includes a cylindrical part 58 and a frustoconical part 60 with a half-angle at the center 61. This lower roller 56 interacts with, an upper cylindrical roller 54. The position of the metal strip 40 is set in such a way that its sheared edge is compressed between the frustoconical part 60 and the cylindrical rollers 54.

FIG. 7 illustrates a final stage of the method. The lower roller 66 includes a cylindrical part 68 and a circular surface 70 with a half-angle at the center 71. This lower roller 66 interacts with an upper cylindrical roller 64. The position of the metal strip 10 is set in such a way that its sheared edge is compressed between the circular surface 70 and the cylindrical roller 64.

If the half-angle at the center 51 of the roller 46 (FIG. 5), the half-angle at the center 61 of the roller 56 (FIG. 6) and the half-angle at the center 71 of the roller 66 (FIG. 7) are compared, it is observed that the angle of inclination of the various rollers is continually increasing. The half-angle 51 is typically of 30°, the half-angle 61 of 60° and the half-angle 71 of the last roller is substantially of 90°. Thus the first rollers taper the extremity of the metal strip, and the subsequent ones fold over the tapered part towards the border in such a way as to reconstitute a flat extremity covered with a plating of brazing alloy, as represented in FIG. 4.

Hence it is seen that the method of the invention can easily be implemented, by a simple modification of the shape of the rollers, making it possible to achieve the addition of a plating of brazing alloy on the sheared edge of the metal strip. The problem of the joining, by brazing, of a part of the tube connected perpendicularly to an inner face of the tune which is devoid of a plating of brazing alloy is resolved in a simple and inexpensive way.

Needless to say, the invention is not limited to the embodiments described above by way of example and is capable of numerous variants.

Thus, in particular, it is possible to push back the layer of brazing alloy by means other than rollers.

What is claimed is:

1. Tube for a heat exchanger, consisting of a metal strip having an outer face and an inner face (34), the outer face being covered with a plating of brazing alloy (31), the metal strip (40) being folded by passing through a series of successive rollers (44, 46, 54, 56, 64, 66) and including at least one folded border (28) having a sheared edge (32) bearing on an inner face (34) of the metal strip (40), characterized in that the sheared edge (32) is a mechanically deformed edge covered with a layer of brazing alloy (33), said layer of brazing alloy (33) having been pushed back mechanically during deformation of said deformed edge from the outer face towards the sheared edge (32).

2. Tube according to claim 1, characterized in that the layer of brazing alloy (33) has been pushed back by the rollers (44, 46, 54, 56, 64, 66) from the outer face towards the sheared edge (32).

3. Method of manufacturing a tube according to claim 1, by folding of a metal strip (40) including a plating of brazing alloy (31) on an outer face, in which the metal strip (40) is made to pass between a series of rollers (44, 46, 54, 56, 64, 66), characterized in that the rollers are shaped to push back the layer of brazing alloy (33) from the outer face towards the sheared edge (32).

4. Method according to claim 3, characterized in that each roller includes a surface (50, 60, 70) which exhibits an angle of inclination (51, 61, 71) with respect to its rotational axis, the inclinations (51, 61, 71) of the successive rollers (44, 46, 54, 56, 64, 66) continually increasing.

5. Heat exchanger, especially for a motor vehicle, consisting of a bank of tubes (16) alternating with corrugated spacers (15), characterized in that the tubes are in accordance with claim 1.

\* \* \* \* \*